United States Patent
Belder et al.

(10) Patent No.: US 11,346,071 B2
(45) Date of Patent: May 31, 2022

(54) METHOD OF AND SYSTEM FOR INSTALLING FOUNDATION ELEMENTS IN AN UNDERWATER GROUND FORMATION

(71) Applicant: IHC HOLLAND IE B.V., Sliedrecht (NL)

(72) Inventors: Cornelis Belder, Oudewater (NL); Erwin Vincent Van Liere, Breda (NL)

(73) Assignee: IHC HOLLAND IE B.V., Sliedrecht (NL)

( * ) Notice: Subject to any disclaimer, the term of this patent is extended or adjusted under 35 U.S.C. 154(b) by 0 days.

(21) Appl. No.: 15/504,998

(22) PCT Filed: Aug. 21, 2015

(86) PCT No.: PCT/NL2015/050585
§ 371 (c)(1),
(2) Date: Feb. 17, 2017

(87) PCT Pub. No.: WO2016/028151
PCT Pub. Date: Feb. 25, 2016

(65) Prior Publication Data
US 2017/0275845 A1    Sep. 28, 2017

(30) Foreign Application Priority Data

Aug. 21, 2014    (NL) .................................. N2013349

(51) Int. Cl.
*E02D 27/52*    (2006.01)
*E02D 27/42*    (2006.01)
(Continued)

(52) U.S. Cl.
CPC ............... *E02D 13/04* (2013.01); *E02D 7/02* (2013.01); *E02D 7/06* (2013.01); *E02D 13/00* (2013.01);
(Continued)

(58) Field of Classification Search
CPC ......... B63B 21/24; B63B 21/26; B63B 21/50; E02B 17/02; E02B 17/027; E02D 7/02;
(Continued)

(56) References Cited

U.S. PATENT DOCUMENTS

| 1,267,129 A | 5/1918 | Sewall |
| 3,572,044 A * | 3/1971 | Pogonowski ......... E21B 33/035 405/204 |

(Continued)

FOREIGN PATENT DOCUMENTS

| CN | 1022966607 A | 12/2011 |
| CN | 102312435 A | 1/2012 |

(Continued)

OTHER PUBLICATIONS

International Search Report and Written Opinion for International application No. PCT/NL2015/050585, dated Dec. 7, 2015.
(Continued)

*Primary Examiner* — Edwin J Toledo-Duran
(74) *Attorney, Agent, or Firm* — Steven M. Koehler; Westman, Champlin & Koehler, P.A.

(57) ABSTRACT

A method of installing foundation elements, in particular (mono)piles having a diameter of five meters or more, in an underwater ground formation includes lowering a leader from a surface vessel with at least the tip of the leader into the water, and lowering a foundation element and/or a noise mitigation screen along the leader.

20 Claims, 3 Drawing Sheets

(51) Int. Cl.
  *E02D 13/04* (2006.01)
  *E02D 13/00* (2006.01)
  *E02D 7/02* (2006.01)
  *E02D 7/06* (2006.01)

(52) U.S. Cl.
  CPC .......... *E02D 13/005* (2013.01); *E02D 27/42* (2013.01); *E02D 27/52* (2013.01); *E02D 27/525* (2013.01); *E02D 27/425* (2013.01)

(58) Field of Classification Search
  CPC ......... E02D 13/04; E02D 27/525; E02D 7/06; E02D 13/00; E02D 13/005; E02D 27/42; E02D 27/52; E02D 27/425; E21B 41/08
  USPC .......................... 405/224, 225, 226, 227, 228
  See application file for complete search history.

(56) References Cited

U.S. PATENT DOCUMENTS

| | | | | |
|---|---|---|---|---|
| 3,575,005 A * | 4/1971 | Sumner | ................. | E02B 17/021 405/196 |
| 3,751,930 A * | 8/1973 | Mott | ................. | E02B 17/02 405/196 |
| 3,754,403 A * | 8/1973 | Mott | ................. | E02D 27/425 405/196 |
| 4,033,139 A * | 7/1977 | Frederick | ................. | E02D 7/10 405/228 |
| 4,117,941 A * | 10/1978 | McCleskey, Jr | ...... | E21B 19/002 414/22.63 |
| 4,135,842 A * | 1/1979 | Blight | ................. | E02B 17/027 405/209 |
| 4,484,840 A * | 11/1984 | Nandlal | ............. | E02B 17/0026 205/732 |
| 4,808,037 A * | 2/1989 | Wade | ................. | E02B 17/00 166/55 |
| 5,360,292 A * | 11/1994 | Allen | ................. | E21B 7/18 405/249 |
| 5,522,680 A * | 6/1996 | Hoss | ................. | E02B 17/00 405/209 |
| 5,777,257 A * | 7/1998 | Kenny | ................. | E21B 29/02 102/307 |
| 6,299,385 B1 * | 10/2001 | Barnes | ................. | E02B 17/021 405/195.1 |
| 8,500,369 B2 | 8/2013 | Mohr | | |
| 2009/0129871 A1 | 5/2009 | Mohr | | |
| 2011/0170956 A1 * | 7/2011 | Vandenbulcke | ........ | E02D 27/50 405/227 |
| 2012/0014753 A1 * | 1/2012 | Jung | ................. | E02D 13/005 405/227 |
| 2013/0243532 A1 * | 9/2013 | Lynderup | ............... | F03D 13/22 405/232 |
| 2013/0294842 A1 | 11/2013 | Mohr | | |
| 2014/0241815 A1 * | 8/2014 | Hansen | .................. | E02D 13/00 405/248 |
| 2015/0110564 A1 * | 4/2015 | West | ..................... | E02D 13/005 405/227 |
| 2019/0271132 A1 * | 9/2019 | Meling | .................. | E02D 27/12 |

FOREIGN PATENT DOCUMENTS

| | | |
|---|---|---|
| DE | 19921312 | 11/2000 |
| DE | 102004043128 A1 | 3/2006 |
| DE | 102005056461 | 5/2007 |
| EP | 1270824 A2 | 1/2003 |
| EP | 1640508 | 3/2006 |
| EP | 1640508 A1 | 3/2006 |
| EP | 1989358 | 11/2008 |
| EP | 1989358 A1 | 11/2008 |
| EP | 2500473 | 9/2012 |
| EP | 2500473 A1 | 9/2012 |
| JP | S49085804 A | 8/1974 |
| JP | S58213917 A | 12/1983 |
| JP | S38001320 B2 | 7/2006 |
| JP | 2011256698 A | 12/2011 |
| JP | 2012012930 A | 1/2012 |
| JP | 2017525873 A | 9/2017 |

OTHER PUBLICATIONS

European Office Action, dated May 11, 2018 for corresponding European Patent Application No. 15784977.9-1002, filed Aug. 21, 2015.
Chinese Office Action, dated Sep. 5, 2018, for corresponding Chinese Patent Application No. 201580044850.4.
Notification of Second Office Action for Chinese patent application No. 201580044850.4, dated Apr. 19, 2019, with English translation.
Japanese Office Action, dated Nov. 12, 2018 for corresponding Japanese Patent Application No. 2017-508971, filed Feb. 16, 2017.
Notice of Reasons for Rejection from the Japanese Patent Office for Japanese Patent Application No. 2017-508971, dated Oct. 7, 2019, with English translation.
Australian Office Action for corresponding Australian Patent Application No. 2015304080, filed Feb. 16, 2017.
Chinese Office Action from the China National Intellectual Property Administration for Chinese patent application No. 201580044850.4, dated Dec. 9, 2019, with English translation.

* cited by examiner

METHOD OF AND SYSTEM FOR INSTALLING FOUNDATION ELEMENTS IN AN UNDERWATER GROUND FORMATION

CROSS-REFERENCE TO RELATED APPLICATION

The present application is a national stage of and claims priority of International patent application Ser. No. PCT/NL2015/050585, filed Aug. 21, 2015, and published in English as WO 2016/028151 A1 the content of which is hereby incorporated by reference in its entirety.

BACKGROUND

The discussion below is merely provided for general background information and is not intended to be used as an aid in determining the scope of the claimed subject matter.

The invention relates to a method of installing foundation elements, in particular (mono)piles having a diameter of five meters or more, in an underwater ground formation. The invention further relates to a system for installing foundation elements, in particular (mono)piles having a diameter of five meters or more, in an underwater ground formation, comprising a vessel, a foundation element and/or a noise mitigation screen.

As explained in European patent publication 1 989 358, offshore ramming work is carried out underwater to establish foundations, for example, for drilling platforms and wind turbines. For wind turbines, large monopiles with a diameter of more than four meters are rammed into the seabed. This ramming results in a substantial underwater noise input, which can have a negative impact on marine fauna. To reduce the noise input underwater, in the method and device according to EP 1 989 358, the material that is to be rammed is surrounded by a fixed flooded sleeve.

In relatively deep waters and/or relatively strong currents and/or relatively high waves, it is difficult to accurately position such large foundation elements and/or noise mitigation screens.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

To this end, the method comprises the steps of lowering a leader from a surface vessel, e.g. a jack-up barge or a floating vessel, with at least the tip, i.e. the lower or distal end, of the leader into the water and lowering a foundation element and/or a noise mitigation screen along the leader, preferably to or past the tip.

In an embodiment, the leader is lowered at least 5 meters, preferably at least 10 meters below the surface of the water.

In another embodiment, the leader comprises a plurality of sections, a first section is lowered into the water and a second section is placed on top of and secured to the first section. In refinement, after placing the second or further section, the leader is lowered further into the water.

In another embodiment, the leader is lowered onto or into the underwater ground formation. In a refinement, the leader is temporarily fixed relative to the underwater ground formation, preferably via penetration of the leader and/or of one or more elements, such as spuds, attached to the leader. In a refinement, first the leader and/or one or more elements attached to the leader is/are allowed to penetrate the underwater ground formation under the weight of the leader and a foundation element and/or a noise mitigation screen mounted to the leader and the foundation element and/or noise mitigation screen is/are subsequently lowered along the leader.

The method provides more controlled lowering and/or more accurate positioning of foundation elements and/or noise mitigation screens through the so-called splash zone, i.e. the area immediately above and below the water level, and, in the mentioned embodiments, beyond the splash zone and onto the ground formation.

To further improve accurate positioning of the foundation element and/or noise mitigation screen, in an embodiment, the position, inclination and/or rotation of the leader relative to the vessel are adjusted, e.g. prior to or during the lowering of the foundation element and/or noise mitigation screen onto the ground formation.

In another embodiment, the position, inclination and/or rotation of a foundation element and/or noise mitigation screen mounted to the leader are adjusted, e.g. relative to the leader and/or to the vessel.

In an embodiment, the noise mitigation screen is lowered along the leader and a foundation element is subsequently lowered inside the noise mitigation screen.

The invention further relates to a system for installing foundation elements, in particular (mono)piles having a diameter of five meters or more, in an underwater ground formation, comprising a surface vessel, a foundation element and/or a noise mitigation screen, and a leader mounted on the vessel and arranged to be lowered from the vessel with at least the tip of the leader into the water and, in that lowered position, to lower a foundation element and/or noise mitigation screen along it and preferably to or past the tip.

In an embodiment, the leader comprises one or more elements, such as spuds, to fix the leader relative to the underwater ground formation.

In another embodiment, the leader is slidably mounted in a guide carried by the vessel, preferably a guide that allows adjusting the position, inclination and/or rotation of the leader relative to the vessel.

To facilitate lowering a foundation element and/or noise mitigation in deeper waters, in an embodiment, the leader comprises a plurality of stacked or stackable sections.

To reduce the effects of waves and/or currents, in an embodiment, the leader comprises an open structure, preferably comprises at least three parallel elongated elements interconnected at regular intervals by further elements, e.g. crosses or inclined rods. This latter construction provides a relatively open, stiff, and lightweight structure. In another embodiment, the leader comprises or essentially consists of a post or pile.

BRIEF DESCRIPTION OF THE DRAWINGS

The invention will now be explained in more detail with reference to the Figures, which show a preferred embodiment of the present method and system.

DETAILED DESCRIPTION

The Figures are schematic in nature and details that are not necessary for understanding the present invention may have been omitted.

Figure 1:
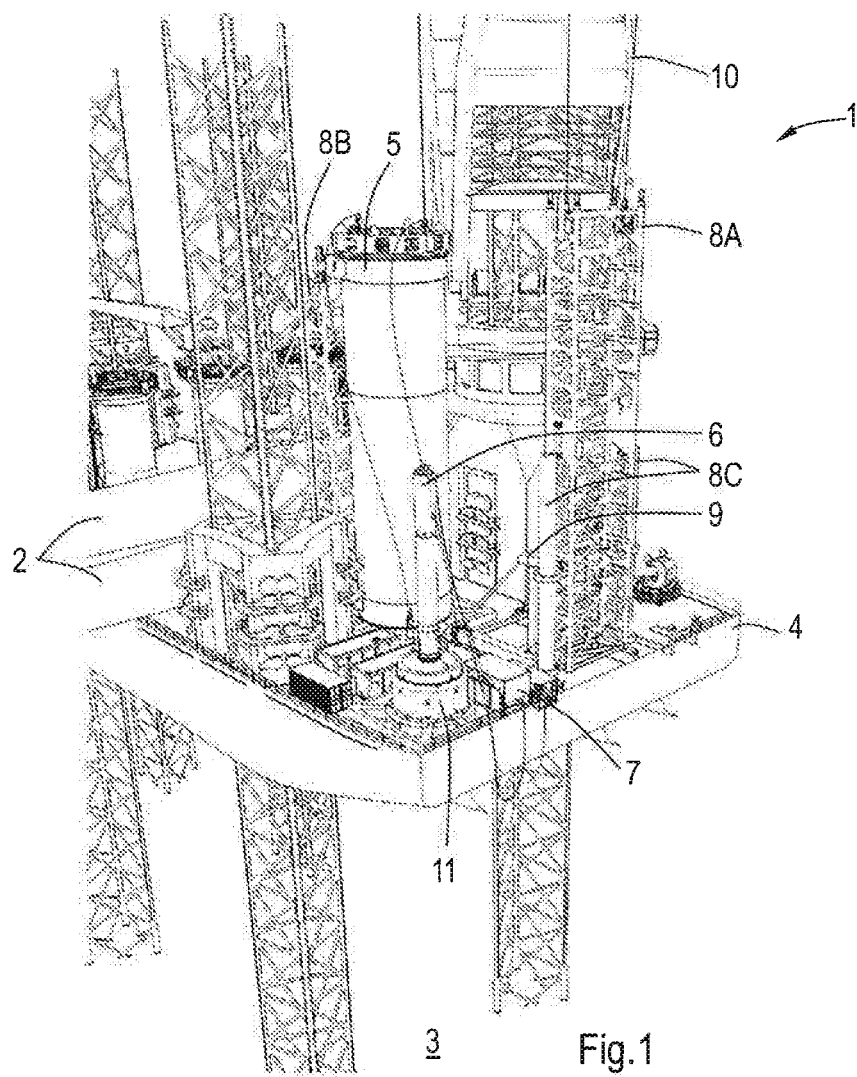
FIG. 1 shows a jack-up barge for installing a monopile and a first stage of installation.

FIG. 1 shows an embodiment of a launch and recovery system 1 for installing a monopile 2 in an underwater ground formation 3, e.g. a seabed. The system 1 comprises a jack-up barge 4 carrying foundation elements and equipment, including, in this example, a plurality of monopiles 2, a noise mitigation screen (NMS) 5, a hydraulic driver 6, e.g. an IHC Hydrohammer S-1800, a power pack 7 for operating the driver, a leader 8, a skidding guide system 9 for the leader 8 and a crane 10 to lift and manipulate the foundation elements and other items.

The driver 6 is equipped with a driver sleeve 11 for securely mounting the driver on a monopile and an anvil (hidden from view by the driver sleeve) for transmitting impact energy from the driver to the monopile. In this example, the monopile 2 has a circular cross-section and a diameter of five (5) meters and is intended to serve, after installation, as the foundation of a wind turbine. The upper section of the monopile 2 shown in the Figures is slightly conical.

Figure 2:
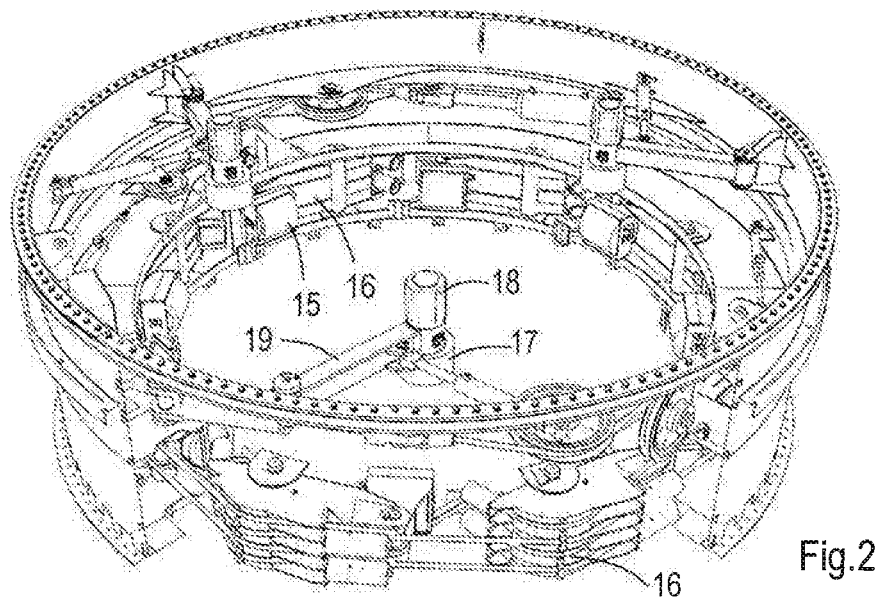
FIG. 2 shows details of a noise mitigation screen that is part of a preferred embodiment of the present invention.

The NMS 5 is, during pile driving, positioned about the pile 2 to reduce noise input from the driver 6 into the surrounding water. In this example, the NMS 5 is made of steel, double-walled, and has a circular cross-section and an inner diameter of six meters. Further, the NMS 5, e.g. the inner wall and/or the upper rim of the NMS 5, is provided with a plurality of guide elements. In this example, at least at or near the upper rim of the screen, shown in detail in FIG. 2, guide wheels 15 are arranged in a circle on pivot arms 16 and are made of a noise damping material, such as rubber. The guide elements can be moved inwards to engage a foundation element positioned in the screen, i.e. they form a flexible diaphragm centralizer. A similar set may be provided e.g. at or near the lower rim of the screen. In this example, the bottom of the NMS 5 is provided with a mechanical wedge (hidden from view by the screen 5).

The NMS 5 also comprises, e.g. on its inner wall and/or at its upper rim, a rotation tool, to adjust the heading of the pile 2 e.g. the position of a cable entry of a wind turbine. In this example, the rotation tool comprises a plurality of wheels 17 and hydraulic motors 18 for driving the wheels 17, arranged in a circle on pivot arms 19. The wheels 17 can be moved inwards to engage a foundation element positioned in the screen 5.

Figure 3:
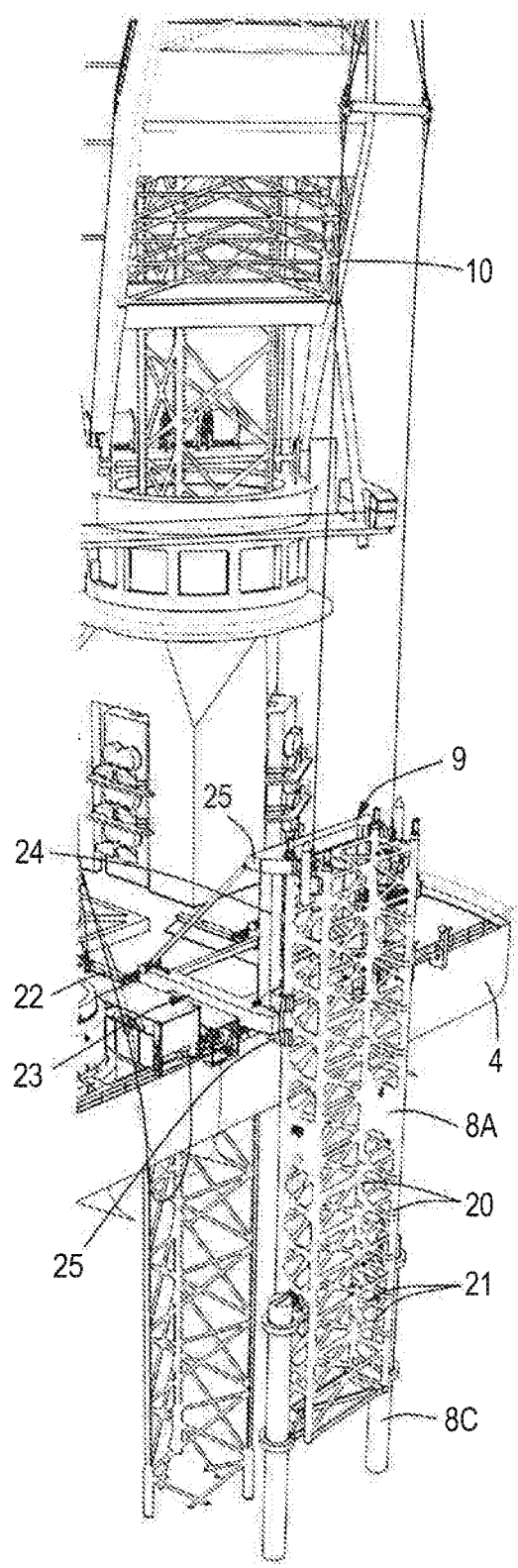
FIGS. 3 to 6 show four stages of installation.

The leader 8 is an open structure comprising e.g. four parallel elongated elements 20 (FIG. 3) interconnected at regular intervals by further elements, e.g. crosses or inclined rods 21. The leader 8 comprises at least two, mechanically interconnectable, sections 8A and 8B. The tip of the leader 8 is provided with one or more spud piles 8C, with which the leader 8 can be temporarily fixed relative to the seabed 3.

The skidding guide system comprises a set of rails 22 (FIG. 3) extending in the longitudinal direction of the barge 4 and a skidding carriage 23 comprising a pair of (skid) beams supported by skid shoes resting on the rails 22. The skid beams are interconnected e.g. via lateral beams or a truss. The carriage further comprises a pivotable frame 24 for carrying and guiding the leader 8. To this end, the frame 24 is provided with e.g. guides 25 or grippers to slidingly hold the leader 8. Further, the carriage is provided, in a manner known in itself, with hydraulic push-pull units to skid the carriages along the rails 22.

Installation of a monopile 2 is carried out for instance as follows.

A first section 8A of the leader 8 is positioned in the skidding guide system, the noise mitigation screen (NMS) 5 is connected to a second section 8B of the leader 8. The first section is skidded to the correct outboard position. At this position, the spud piles 8C that are connected to the first leader stage 8A are lowered and locked at the bottom of the leader 8. The first section 8A is lowered through the splash zone until the top of the first section leader 8A is approximately on the same level as the guide, FIG. 3.

Figure 4:
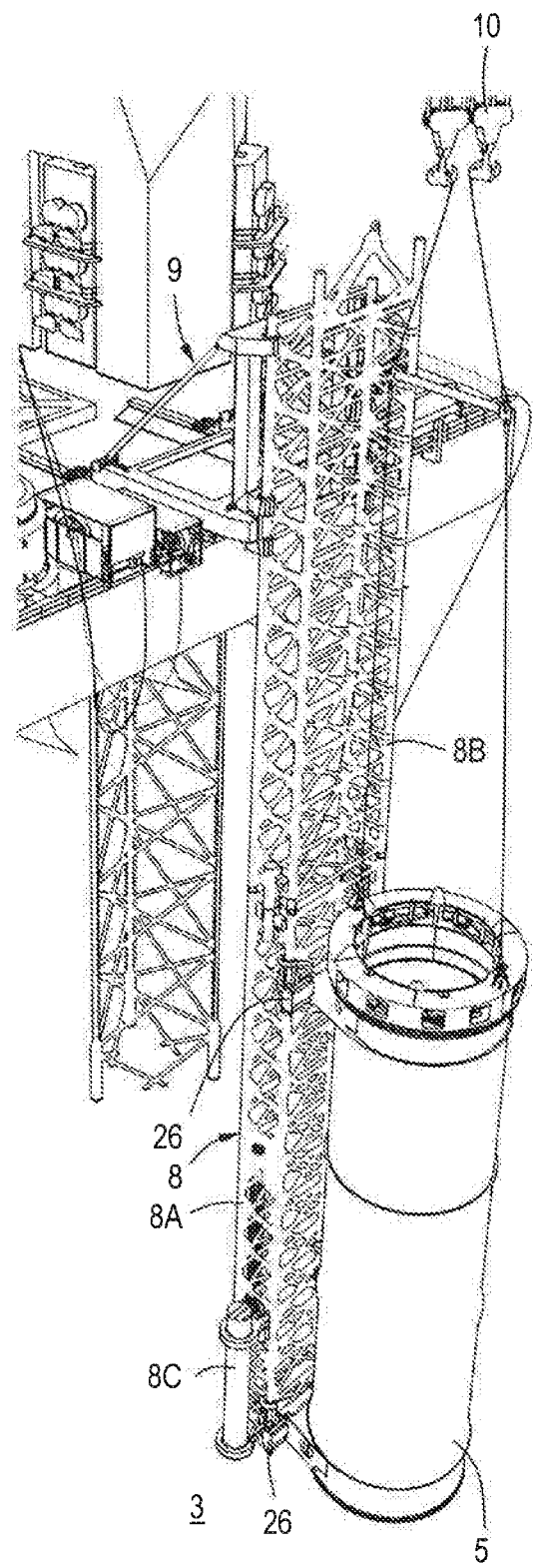

The second section 8B of the leader 8, carrying the NMS 5, is positioned on top of the first section 8A and the two leader sections 8A, 8B are hydraulically connected to provide a continuous, rigid leader 8. The assembled leader 8 including the NMS 5 is lowered onto the seabed 3. Due to the total weight of the leader 8 and NMS 5 the spud piles will penetrate the seabed 3 providing a stable fixation, to resist impact from waves and current. After fixation, the NMS 5 is decoupled from the second section 8B of the leader 8 and is lowered through the splash zone and to approximately 50-100 cm above the seabed 3. Once the NMS 5 has arrived above the seabed 3 a first positioning and inclination sequence starts. I.e., Y axis inclination is corrected by pivoting the guiding frame 24 on the skidding carriage 23 e.g. by means of hydraulic cylinders. Both X axis inclinations are corrected by X axis inclination systems 26. Once the NMS 5 has reached the correct inclination (typically vertical) and position, it is lowered onto the seabed 3, FIG. 4.

Figure 5:
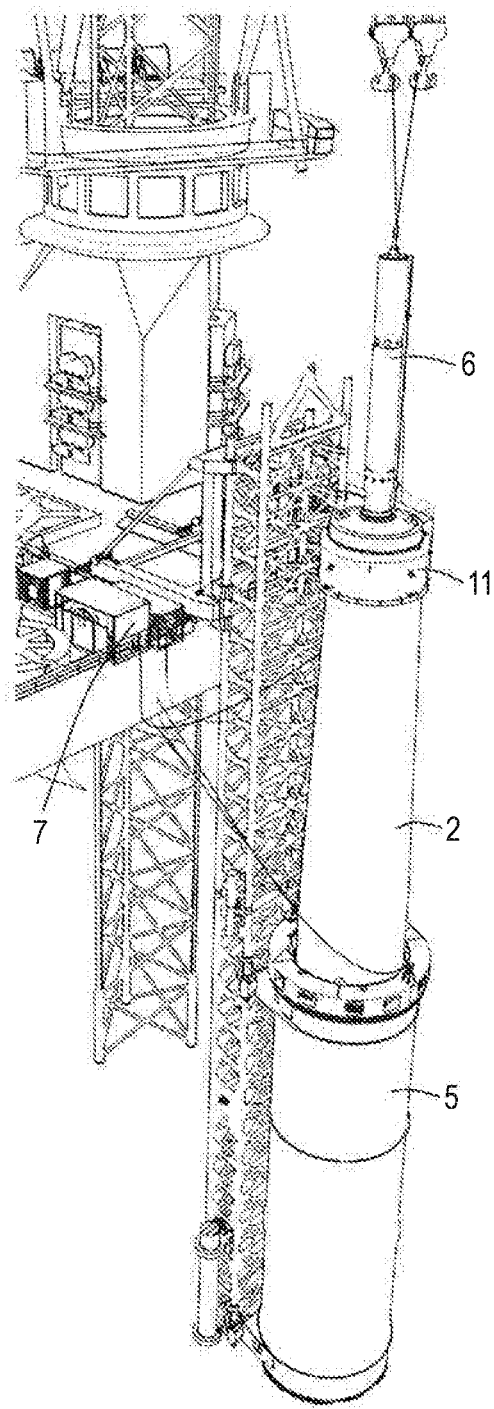
Figure 6:
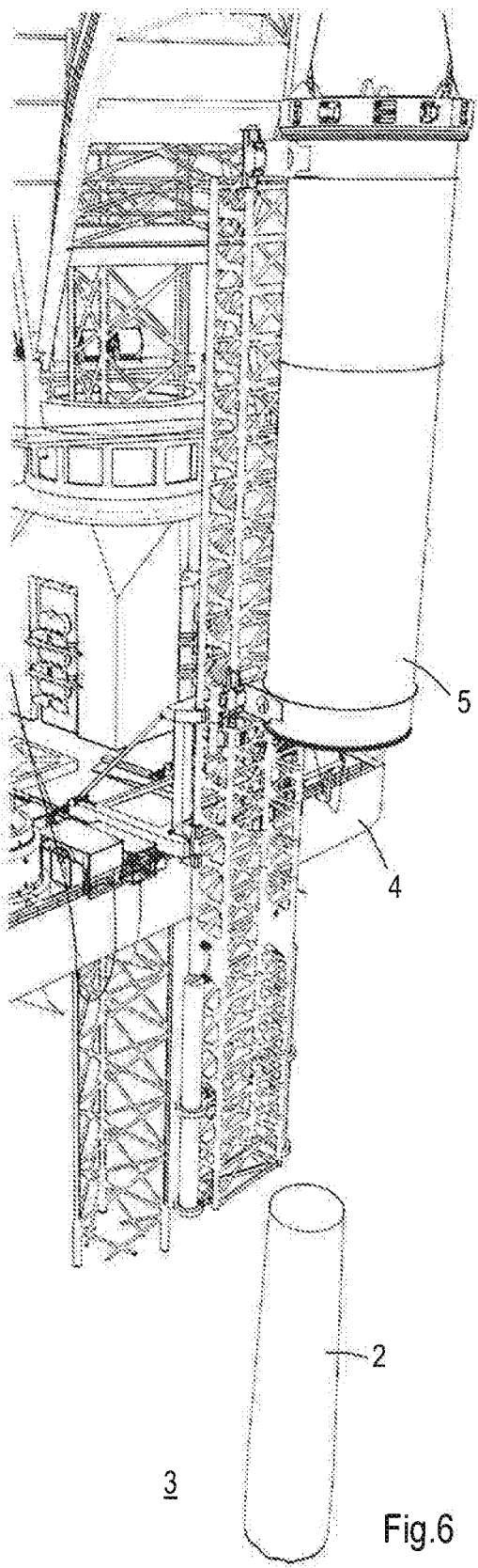

A monopile 2 is inserted in the NMS 5, the upper rim of the NMS 5 ensuring proper entry, and the flexible diaphragm top centralizer with wheels 15 is tightened to engage and guide the pile 2. At the bottom of the NMS 5, a mechanical wedge ensures the concentric position of the pile in the NMS 5. Thus, the NMS 5 will guide and impose a vertical orientation on the monopile 2. Due to settlement of the soil and equipment a second adjustment of inclination and position may be necessary. Adjusting inclination is again carried out by the deck mounted skid guide as described above. Position is adjusted by the top mechanism located on the NMS 5. When completed, the piling sequence will start according to standard procedures (FIG. 5).

Once the monopile 2 is installed, the recovery of the NMS 5 will be carried out substantially in reverse order. The leader 8 guided removal of the NMS 5 avoids or reduces contact with the monopile 2 during retracting. After the NMS 5 has been hoisted to the top of the leader 8 it is locked to the leader 8, winches in the lower leader section retract both spud piles, the complete structure is hoisted in one lift guided by the deck mounted skid guide, the second section of the leader 8 carrying the NMS 5 is removed and positioned on a sea fastening, the first section 8A of the leader 8 is hoisted to deck level and skidded back to sea fastening positioning.

The invention is not restricted to the embodiment described above and can be varied in numerous ways within the scope of the claims. E.g., the method and system are also suitable to install smaller piles, such as jacket piles which require accurate positioning (fitting the jacket footprint).

The invention claimed is:

1. A method of installing foundation elements in an underwater ground formation comprising:
lowering a stiff elongated leader directly adjustably mounted to a surface vessel such that the elongated leader extends from the surface vessel with at least a tip of the elongated leader into water, and at least a portion of the elongated leader extending above the water, the elongated leader lowered with restrained linear motion,
joining at least one of a foundation element and a noise mitigation screen to the elongated leader, wherein joining the at least one of the foundation element and the noise mitigation screen to the elongated leader comprises joining to the elongated leader with an upper portion of the at least one of the foundation element and the noise mitigation screen above the water, and
after joining the at least one of the foundation element and the noise mitigation screen to the elongated leader, lowering the at least one of the foundation element and the noise mitigation screen in the water toward the underwater ground formation by displacing the at least one of the foundation element and the noise mitigation screen with respect to the elongated leader while being movably joined to the elongated leader.

2. The method according to claim 1, wherein the elongated leader is lowered at least 5 meters.

3. The method according to claim 1, wherein the elongated leader comprises a plurality of sections, a first section is lowered into the water and a second section is placed on top of and secured to the first section.

4. The method according to claim 1, wherein the elongated leader is lowered onto or into the underwater ground formation.

5. The method according to claim 1, wherein the elongated leader is temporarily fixed relative to the underwater ground formation.

6. The method according to claim 1, wherein first the elongated leader, or the elongated leader and one or more elements attached to the elongated leader, is/are allowed to penetrate the underwater ground formation under a weight of the elongated leader and the at least one of the foundation element and the noise mitigation screen mounted to the elongated leader and the at least one of the foundation element and the noise mitigation screen is/are subsequently lowered with respect to the elongated leader.

7. The method according to claim 1, wherein at least one of a position, an inclination and a rotation of the elongated leader relative to the vessel are adjusted.

8. The method according to claim 1, wherein at least one of a position, an inclination and a rotation of the at least one of the foundation element and the noise mitigation screen mounted to the elongated leader are adjusted.

9. The method according to claim 1, wherein the elongated leader is temporarily fixed relative to the underwater ground formation via penetration of the elongated leader and any elements attached to the elongated leader.

10. The method according to claim 1, and further comprising joining at least one of the foundation element and the noise mitigation screen to the elongated leader, wherein joining the at least one of the foundation element and the noise mitigation screen to the elongated leader comprises joining to the portion of the elongated leader above the water, and wherein lowering comprises lowering the at least one of the foundation element and the noise mitigation screen to the leader from above the water to below a surface of the water.

11. A system for installing foundation elements in an underwater ground formation, comprising a surface vessel, a foundation element, a noise mitigation screen, and a stiff elongated leader, at least one of the foundation element and the noise mitigation screen being mounted to the leader with an upper portion of the at least one of the foundation element and the noise mitigation screen being above a surface of water, the leader being directly adjustably mounted to the vessel and arranged to be lowered with restrained linear motion from the vessel such that the leader extends from the surface vessel with at least a tip of the leader into water and at least a portion of the leader extending above the water, and, in that lowered position, the leader is configured to lower the at least one of the foundation element and the noise mitigation screen by displacing the at least one of the foundation element and the noise mitigation screen with respect to the leader, while being movably joined to the leader.

12. The system according to claim 11, wherein the leader is arranged to be lowered from the surface vessel to at least 5 meters.

13. The system according to claim 11, wherein the leader comprises one or more elements to fix the leader relative to the underwater ground formation.

14. The system according to claim 11, wherein the leader is slidably mounted in a guide carried by the vessel.

15. The system according to claim 11, wherein the leader comprises a plurality of stacked or stackable sections.

16. The system according to claim 11, wherein the leader comprises an open structure.

17. The system according to claim 16 wherein the open structure comprises at least three parallel elongated elements interconnected at regular intervals by further elements.

18. The system according to claim 14 wherein the guide is configured to adjust at least one of a position, an inclination and a rotation of the leader relative to the vessel.

19. The system according to claim 11, wherein the leader is arranged to be lowered from the surface vessel to at least 10 meters below a waterline.

20. The system according to claim 11, wherein the leader is arranged to be lowered from the surface vessel onto or into the underwater ground formation.

* * * * *